US006132235A

United States Patent [19]

Kitada

[11] Patent Number: 6,132,235

[45] Date of Patent: Oct. 17, 2000

[54] CONNECTOR LOCK MECHANISM

[75] Inventor: Masashi Kitada, Shizuoka, Japan

[73] Assignee: Yazaki Corporation, Tokyo, Japan

[21] Appl. No.: 09/218,449

[22] Filed: Dec. 22, 1998

[30] Foreign Application Priority Data

Dec. 22, 1997 [JP] Japan .................................... 9-353715

[51] Int. Cl.$^{7}$ ...................................................... A01R 13/64

[52] U.S. Cl. ............................................................... 439/372

[58] Field of Search .................................... 439/372, 342, 439/345, 347, 350–55, 357, 358, 484, 680

[56] References Cited

U.S. PATENT DOCUMENTS 5,139,432 8/1992 Sugiyama et al. ....................... 439/372

5,788,530 8/1998 Kasai ....................................... 439/372

FOREIGN PATENT DOCUMENTS 0 470 423 2/1992 European Pat. Off. ...... H01R 13/639

0 654 863 5/1995 European Pat. Off. ...... H01R 13/629

*Primary Examiner*—Steven L. Stephan

*Assistant Examiner*—Eugene G. Byrd

*Attorney, Agent, or Firm*—Sughrue, Mion, Zinn, Macpeak & Seas, PLLC

[57] ABSTRACT

The connector lock mechanism according to the invention includes a pair of guide plates (5) which are respectively disposed in the neighborhood of one connector housing (3) provided on and projected from an electric connection box (1) and each of which includes a shaft hole (9), and a lock member (15) including a pair of flexible support pieces (17) on each of which there is projectingly provided a cylindrical-shaped projection (18) fittable with the shaft hole (9). In each of the guide plates (5), there are formed a provisionally securing portion (10) on which the cylindrical-shaped projection (18) can be mounted, and a guide groove (8) for connecting the provisionally securing portion (10) to the shaft hole (9). By pressing a given position of the lock member (15), the cylindrical-shaped projections (18) mounted on provisionally securing portions (10) can be fitted with the shaft holes (9) through the guide grooves (8).

4 Claims, 6 Drawing Sheets

CONNECTOR LOCK MECHANISM

BACKGROUND OF THE INVENTION

1. Field of the Invention

The present invention relates to a connector lock mechanism which prevents the removal of a partner connector connected to a connector housing of an electric connection box in a double manner.

2. Related Art

Conventionally, as a connector lock mechanism for holding a fit state between connectors, there are known various connector lock mechanisms. For example, in Examined Japanese Utility Model Publication Hei. 8-9911, there is disclosed a connector lock mechanism capable of preventing the removal of a partner connector (the other connector), which has been previously invented and applied for a patent by the present applicants. In FIG. 7, there is shown an exploded perspective view of an electric connection box to which the above disclosed connector lock mechanism is applied.

In FIG. 7, on a substrate 101 of an electric connection box 100, there is projectingly provided a rectangular connector housing 102 and, on the wall surface of one of the long sides of the rectangular connector housing 102, there are disposed a pair of guide plates 103 in such a manner as to hang down onto the substrate 101. Also, between the pair of guide plates 103, there is interposed a reinforcing insertion plate 104 in such a manner that it stands erect on the substrate 101. On the inner wall side of each of the guide plates 10, there is formed a groove 105 obtained by cutting away the guide plate inner wall from the top portion thereof to the intermediate portion thereof and, in the bottom portion of the groove 105, there is formed a shaft hole 106 serving as a portion to be pivotally mounted in such a manner that it intersects at right angles to the groove bottom portion. Also, on the two wall surfaces of the short sides of the connector housing 102, there are provided securing projections 107 respectively.

A lock member 110, which is used to secure a partner connector, includes a pair of flexible support pieces 111 which are disposed in such a manner as to hang down from the base portion 119 of the lock member 110, while each of the flexible support pieces 111 includes a cylindrical-shaped projection 112 provided on and projected from the outer wall of the leading end thereof. The tapered surface of the cylindrical-shaped projection 112 is chamfered in order to facilitate the fitting operation of the projection 112 into the axial hole 106 (which will be discussed later). Also, on the upper portion of the base portion 119, there are disposed not only a lock plate 114 for securing the partner connector but also two flexible securing pieces 113 which respectively correspond to the above-mentioned securing projections 107 of the connector housing 102.

Further, on the lock member 110, there is mounted a plate spring 116 which is bent substantially in a J-shaped manner, while the lock member 110 is shown more clearly in FIGS. 8 and 9. The plate spring 116 includes such a securing hole 117 as shown in FIG. 9, while the plate spring 116 is secured by a plate spring securing projection 118 which, as shown in FIG. 8, is provided on the lock member 110.

To assemble the above-structured lock member 110 to the connector housing 102, an inclined recess 115 formed in the base portion 119 may be pressed toward the guide plate 103 side by such a jig rod 120 as shown in FIG. 7. That is, if the inclined recess 115 is pressed in this manner, then the cylindrical-shaped projections 112 respectively provided on the pair of flexible support pieces 111 can be fitted into the shaft holes 106 respectively formed in the pair of guide plates 105. Here, the vertical direction of the inclined recess 115, that is, the axial direction of the jig rod 120 has an inclination of an angle $\alpha$ with respect to the vertical direction of the lock plate 114. By assembling the lock member 110 to the connector housing 102 in such inclined manner, the flexible securing pieces 113 are prevented from interfering with the securing projections 107 of the connector housing 102 when the lock member 110 is pushed into the connector housing 102.

According to the above-mentioned connector lock mechanism, not only because the lock member 110 is held upwardly of the guide plates 103 but also because the inclined recess 115 of the lock member 110 is pressed by the jig rod 120, the lock member 110 can be assembled easily to the connector housing 102, thereby being able to obtain a high efficiency in the assembling operation.

However, in the above-mentioned conventional connector lock mechanism, when pressing the inclined recess 115 using the jig rod 120 by one hand, the lock member 110 must be held by the other hand to thereby position the lock member 110 at a given position. In this operation, since the plate spring 116 is elastically contacted with the wall surface of the connector housing 102 to thereby energize the lock member 110 in a direction where the lock member 110 is moved apart from the connector housing 102, it is troublesome to hold on the lock member 110 at the given position.

SUMMARY OF THE INVENTION

Accordingly, it is an object of the invention to provide an improved connector lock mechanism which can facilitate the assembling of a lock member to the neighboring portion of a connector housing.

In attaining the above object, according to the present invention, there is provided a connector lock mechanism which comprises: a pair of guide plates respectively disposed in the neighborhood of one connector provided on and projected from an electrical connection box, each guide plate including a bearing; and, a lock member including a pair of flexible support pieces, each flexible support piece having a shaft portion projectingly provided thereon, the shaft portion being fittable with the bearing, whereby the lock member is rotated around said shaft portions of the flexible support pieces to thereby secure the other connector (partner connector) fitted with the above-mentioned one connector, characterized in that, in each of the pair of guide plates, there are formed a provisionally securing portion on which the above-mentioned shaft portion can be mounted, and a guide groove for connecting together the bearing and provisionally securing portion, and, by pressing a given portion of the lock member, the shaft portions mounted on the provisionally securing portions can be fitted with the bearings respectively.

Here, as the provisionally securing portions, there can be employed a pair of grooves which are cut formed in the inner walls or outer walls of the pair of guide plates, or a pair of ribs which are provided on and projected from the respective end portions of the pair of guide plates. However, the provisionally securing portions are not limited to them but other various means can also be employed.

According to the thus structured connector lock mechanism, since the provisionally securing portions are formed in the guide plates respectively, by mounting the shaft portion onto the provisionally securing portions, the lock member can be positioned easily. Also, because, in each of the pair of guide plates, there is formed the guide groove which is used to connect together the provisionally securing portion and bearing, by pressing a given portion of the lock member, the shaft portions mounted on the provisionally securing portions can be fitted with the bearings smoothly. This can facilitate the assembling of the lock member to the neighborhood of the connector housing.

Also, according to another aspect of the present invention, there is provided a connector lock mechanism in which, in the neighborhood of the guide plates, there is disposed the support portion which is capable of supporting the lock member in a state where the shaft portions are mounted on their respective provisionally securing portions. This structure eliminates the need to hold the lock member when assembling the lock member to the connector housing, thereby being able to reduce the burden of the assembling operation, so that the efficiency of the assembling operation can be enhanced further.

Further, according to still another aspect of the present invention, there is provided a connector lock mechanism in which each of the above-mentioned two provisionally securing portions includes a tapered surface slidingly contactable with the front end of its associated shaft portion on the side thereof facing its associated bearing. Thanks to this structure, by pressing a given portion of the lock member, the shaft portions mounted on their respective provisionally securing portions can be fitted with their respective bearings further smoothly.

DETAILED DESCRIPTION OF THE DRAWINGS

DETAILED DESCRIPTION OF THE PREFERRED EMBODIMENT

Now, description will be given below in detail of a preferred embodiment of a connector lock mechanism according to the invention with reference to FIGS. 1 to 6. At first, FIG. 1 is an exploded perspective view of an electric connection box to which an embodiment of a connector lock mechanism according to the invention is applied.

Figure 1:
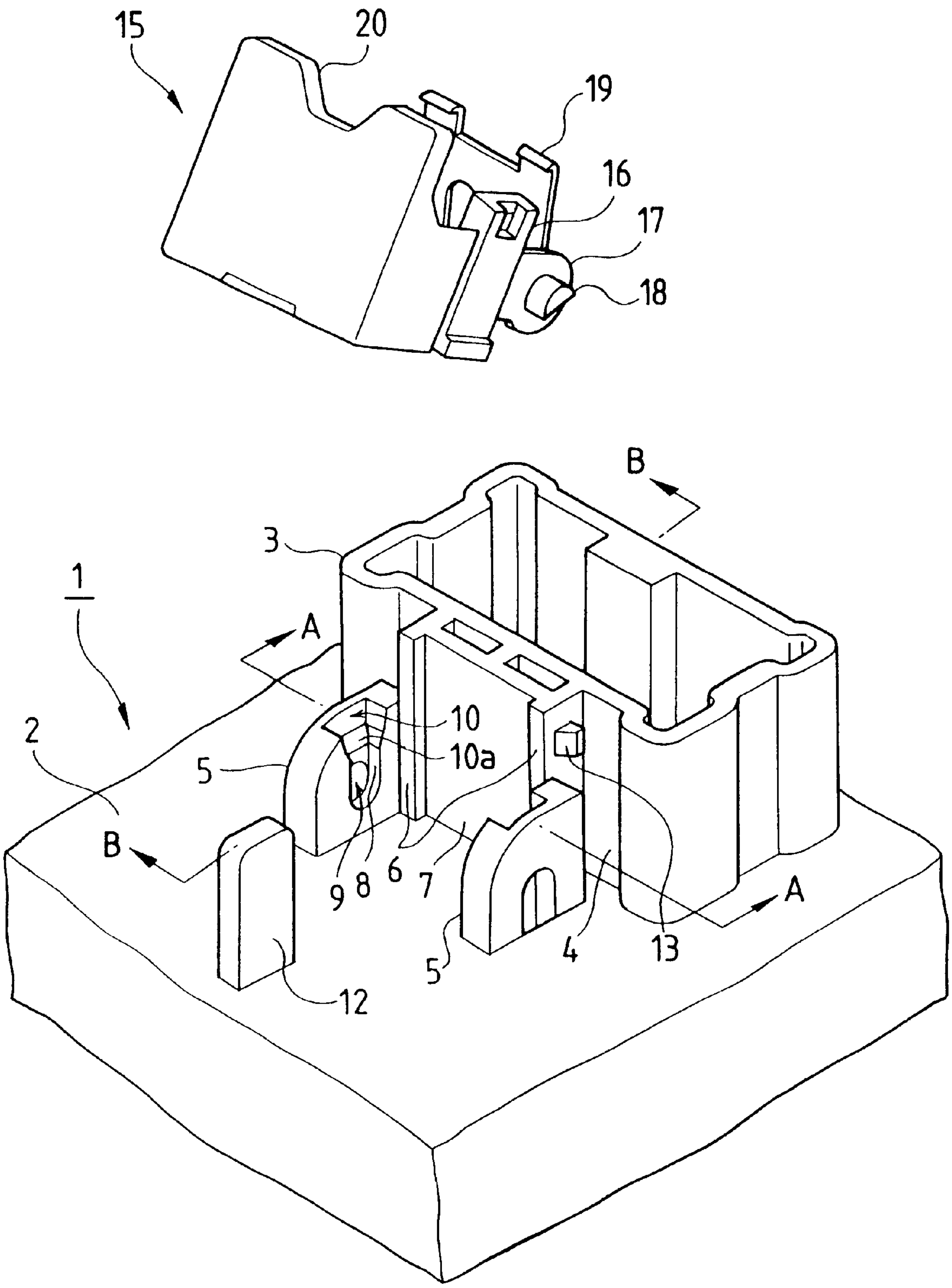
FIG. 1 is an exploded perspective view of an electric connection box to which an embodiment of a connector lock mechanism according to the invention is applied.

As shown in FIG. 1, on a substrate 2 of an electric connection box 1, there are projectingly provided a connector housing 3, and a pair of guide plates 5 each including a shaft hole serving as a bearing. On one wall surface of the connector housing 3 and on the inside portions of the two guide plates 5, there are projectingly disposed a pair of securing pieces 6 each including a securing projection 13 and further, on the inside of the two securing pieces 6, there is formed a support surface 7 to which a plate spring (which will be discussed later) can be elastically contacted.

On the other hand, a lock member 15, similarly to the conventional lock member, comprises a pair of flexible support pieces 17 each including a cylindrical-shaped projection 18 with the tapered surface thereof chamfered, a lock plate 20 for securing a partner connector (the other connector), a pair of flexible securing pieces 16 respectively corresponding to the securing projections 13 of the connector housing 3, and a plate spring 19 bent substantially in a J shape.

And, on the inner wall side of each of the pair of guide plates 5, there is formed a provisionally securing portion 10 which provides a characteristic structure of the invention. Here, the provisionally securing portion 10 is formed of a groove which has a width larger than the outside diameter of the cylindrical-shaped projection 18. Also, the bottom portion of the provisionally securing portion 10 is connected through a tapered surface 10*a* thereof to a guide groove 8 having a width substantially equal to the outside diameter of the cylindrical-shaped projection 18. Further, in the bottom portion of the guide groove 8, there is formed a shaft hole 9 with which the cylindrical-shaped projection 18 can be fitted in a freely rotatable manner.

And, on the substrate 2 of the electrical connection box 1, there is projectingly provided a support portion 12 which provides another characteristic structure of the invention.

Figure 2:
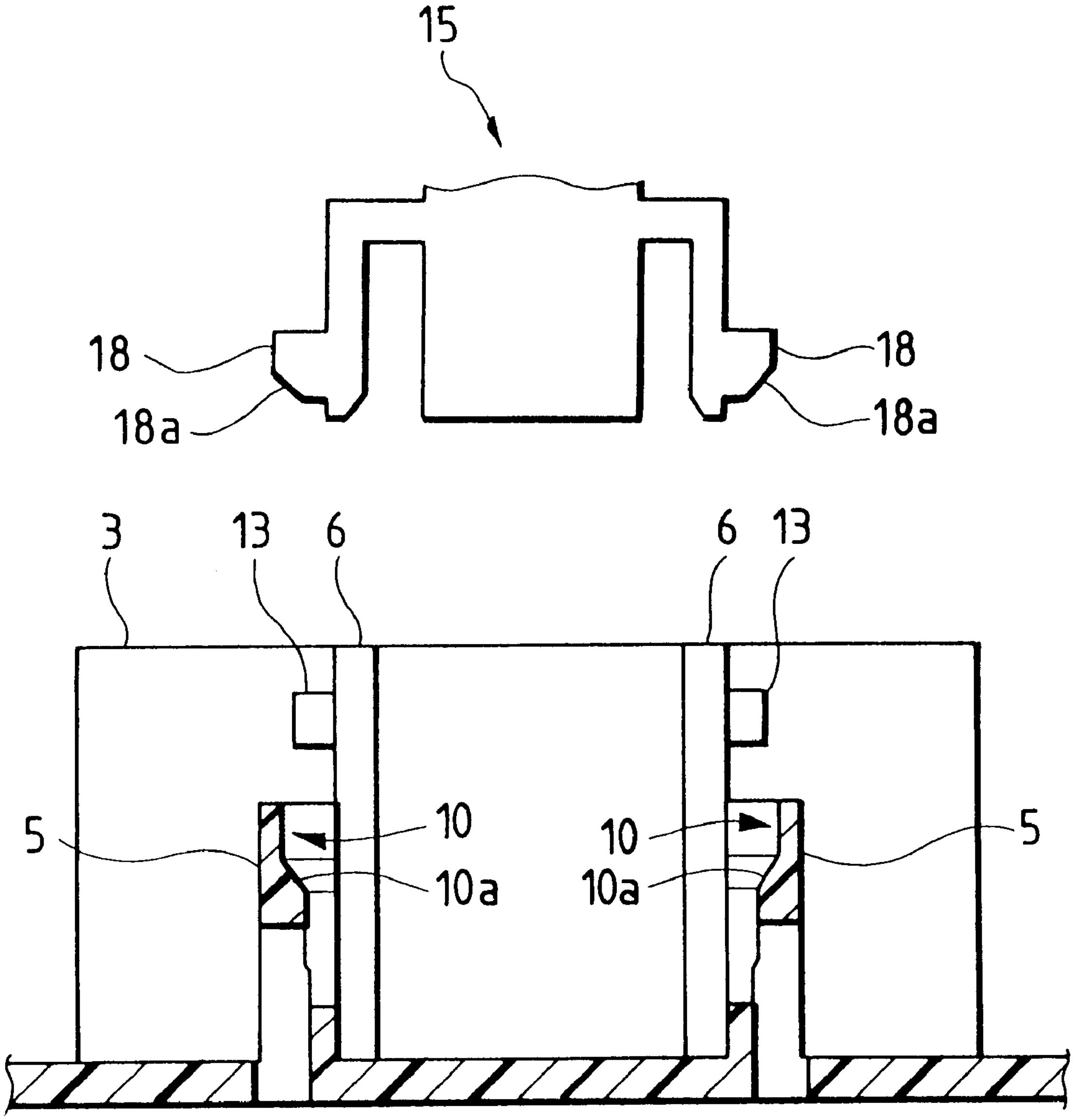
FIG. 2 is a section view taken along the line A—A shown in FIG. 1.

Now, FIG. 2 is a section view taken along the line A—A shown in FIG. 1. As shown in FIG. 2, the tapered surface 10*a*, which is formed in such a manner as to adjoin the bottom portion of the provisionally securing portion 10, has an inclination substantially equal to a tapered surface 18*a* formed in the cylindrical-shaped projection 18 of the lock member 15.

Figure 3:
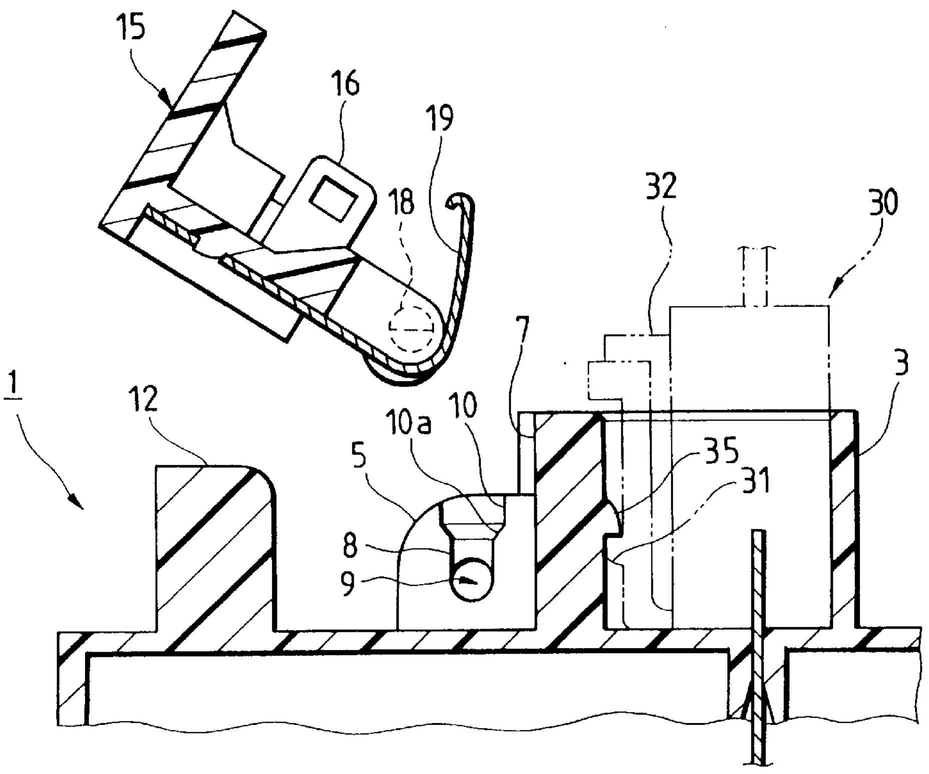
FIG. 3 is a section view taken along the line B—B shown in FIG. 1.

Next, description will be given below of a method for assembling the lock member 15 according to the invention with reference to FIGS. 3 to 6. Now, FIG. 3 is a section view taken along the line B—B shown in FIG. 1, showing a state before the lock member 15 is assembled to the electric connection box 1. Here, a partner connector 30 is secured to the connector housing 3 by securing means 31 and 35.

In particular, according to the present assembling method, at first, the cylindrical-shaped projections 18 of the lock member 15 are respectively mounted onto the provisionally securing portions 10 of the guide plates 5.

Figure 4:
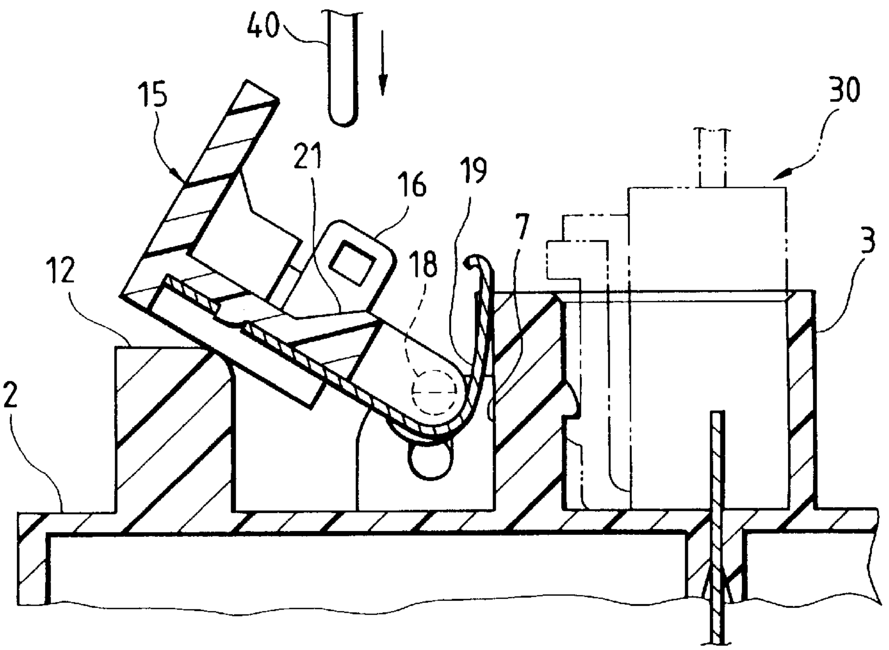
FIG. 4 is a section view similar to FIG. 3, showing a state in which a lock member shown in FIG. 3 is mounted on provisionally securing portions.

As a result of this, as shown in FIG. 4, the leading end portion of the plate spring 19 is elastically contacted with the support surface 7 of the connector housing 3 to thereby energize the lock member 15 in a direction where the lock member 15 is moved away from the connector housing 3 but, because the cylindrical-shaped projections 18 are provisionally secured to the provisionally securing portions 10, the position of the lock member 15 is prevented from being shifted. Also, the support portion 12 supports the lock member 15 in such a manner that an inclined recess 21 formed in the interior portion of the lock member 15 can be made to extend in parallel to the substrate 2. In this state, an operator may release the hand that has been holding the lock member 15.

Next, the inclined recess 21 is pushed in a direction of an arrow shown in FIG. 4 by a jig rod 40.

Figure 5:
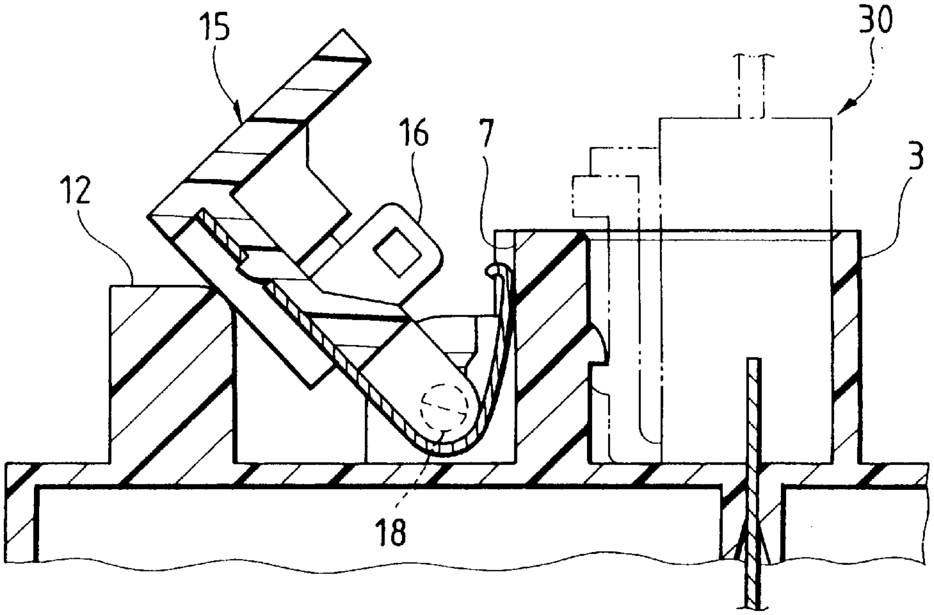
FIG. 5 is a section view similar to FIG. 4, showing a state in which the lock member shown in FIG. 4 is finally secured to bearings.

Consequently, as shown in FIG. 5, the cylindrical-shaped projections 18 are respectively fitted into the shaft holes 9 through the guide holes 8 shown in FIG. 3 and are thereby secured finally or actually.

Figure 6:
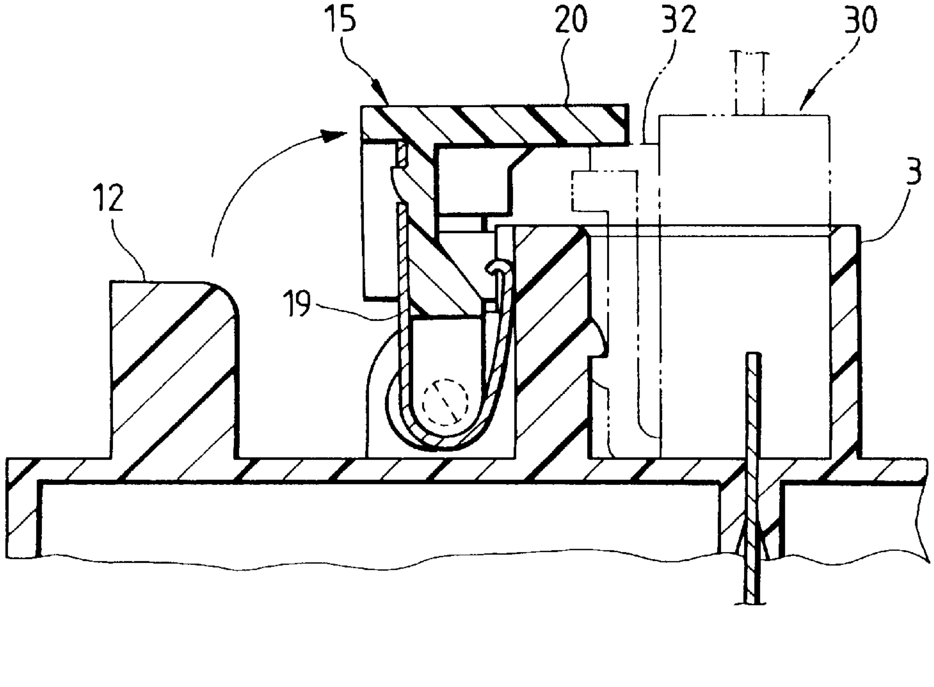
FIG. 6 is a section view similar to FIG. 5, showing a state in which the lock member shown in FIG. 5 is rotated and a partner connector is secured.
Figure 7:
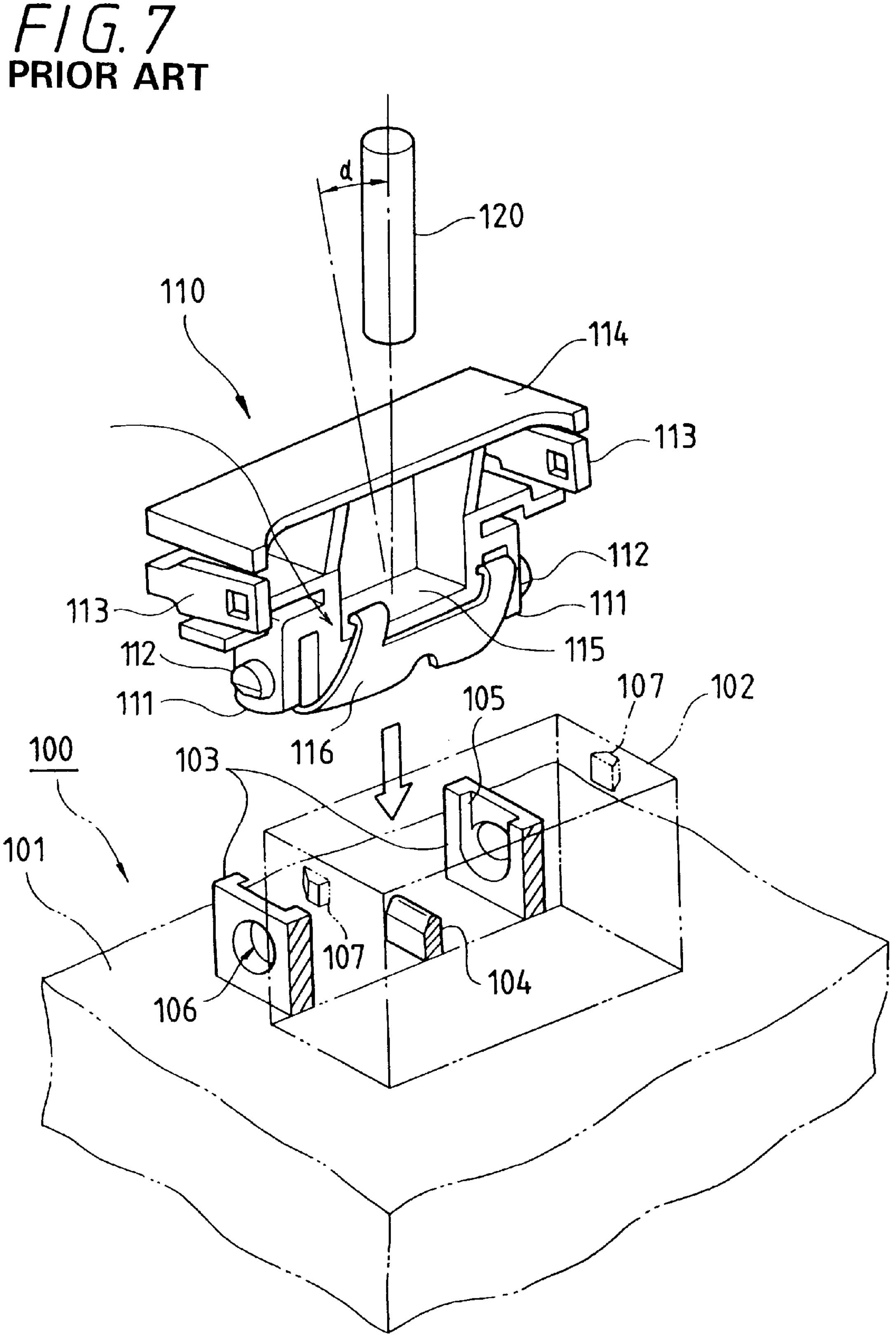
FIG. 7 PRIOR ART
FIG. 7 is an exploded perspective view of an electric connection box to which a conventional connector lock mechanism is applied.
Figure 8:
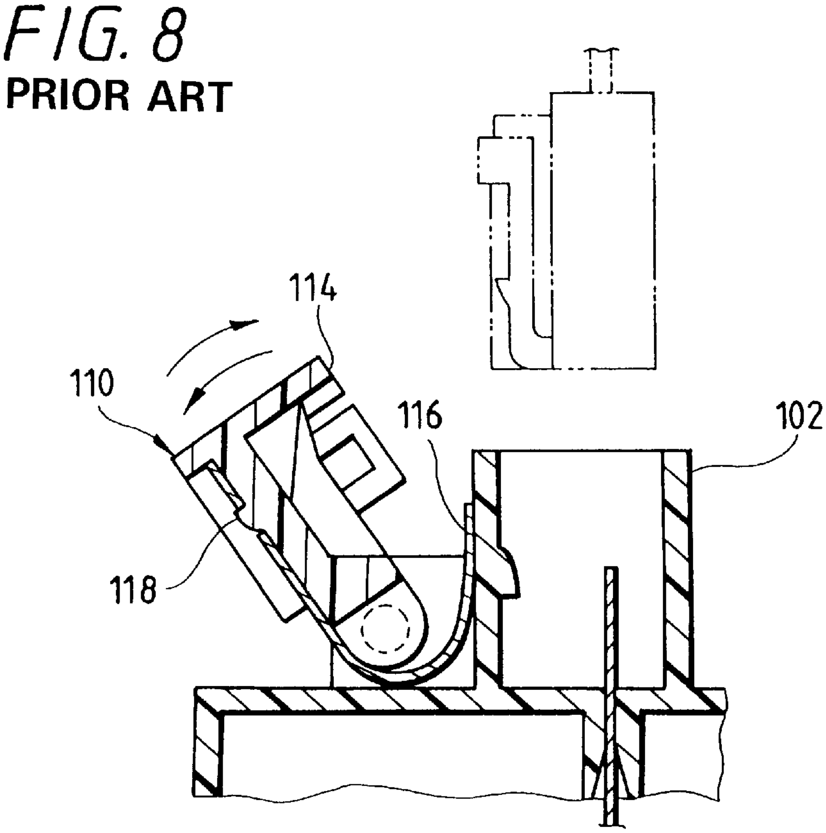
FIG. 8 PRIOR ART
FIG. 8 is a longitudinal section view of the conventional connector lock mechanism shown in FIG. 7.
Figure 9:
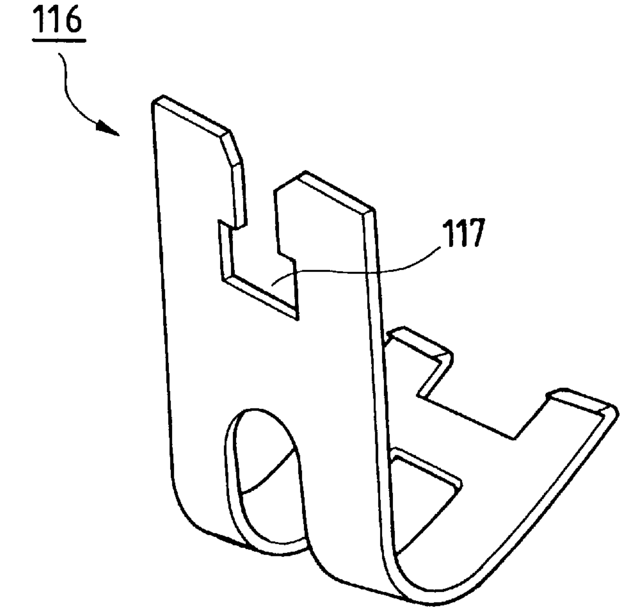
FIG. 9 PRIOR ART
FIG. 9 is a perspective view of a plate spring employed in the conventional connector lock mechanism shown in FIG. 7.

In this state, if the lock member 15 is rotated around the cylindrical-shaped projections 18 to thereby secure the flexible securing pieces 16 by means of the securing projections 13 provided on the connector housing 3 shown in FIG. 1, then, as shown in FIG. 6, the shoulder portion 32 of the partner connector 30 can be secured by the lock plate 20.

In the above-mentioned connector lock mechanism according to the present embodiment, on the guide plates 5, there are provided the provisionally securing portions 10 each of which is formed as a groove having a width larger than the outside diameter of the cylindrical-shaped projection 18; the bottom portions of the provisionally securing portions 10 are respectively connected through the tapered surfaces 10*a* to the guide grooves 8 each having a width substantially equal to the outside diameter of the cylindrical-shaped projection 18; and, in the bottom portions of the guide grooves 8, there are formed the shaft holes 9 in such a manner that they intersect at right angles to the guide grooves.

Therefore, the cylindrical-shaped projections 18 of the lock member 15 can be mounted onto the provisionally securing portions 10 easily and also, by pressing the inclined recess 21 of the lock member 15 using the jig rod 40 in that state, the cylindrical-shaped projections 18 can be fitted into the shaft holes 9 smoothly.

Also, in the present connector lock mechanism, on the substrate 2 of the electric connection box 1, there is supported the support portion 12 for supporting the lock member 15 in such a manner that, when the cylindrical-shaped projections 18 of the lock member 15 are mounted on the provisionally securing portions 10, the inclined recess of the lock member 15 can be made parallel to the substrate 2.

According to this, in a state where the cylindrical-shaped projections 18 of the lock member 15 are mounted on the provisionally securing portions 10, while releasing one hand from the lock member 15, the operator can press the lock member 15 by the other hand using the jig rod 40, thereby being able to reduce the burden of the assembling operation.

In the above-mentioned embodiment, the connector mechanism according to the invention is applied to the electric connection box. However, this is not limitative but the invention can also be applied to other various connectors which are disposed on various kinds of equipment.

As has been described heretofore, in the connector lock mechanism according to the invention, in the guide plates, there are formed the provisionally securing portions on which the shaft portions (cylindrical-shaped projections) can be mounted as well as the guide grooves for connecting the bearings (shaft holes) to the provisionally securing portions, and, by pressing the given portion of the lock member, the shaft portions mounted on the provisionally securing portions can be fitted with the bearings.

Therefore, by mounting the shaft portions onto the provisionally securing portions, the positioning of the lock member can be achieved easily and the shaft portions mounted on the provisionally securing portions can be fitted with the shaft portions smoothly, which makes it possible to enhance the efficiency of the operation to assemble the lock member to the neighboring portion of the connector housing.

Also, in the connector lock mechanism according to the present invention, if there is disposed in the neighborhood of the guide plates the support portion for supporting the lock member in a state where the shaft portions are mounted on their respective provisionally securing portions, it is not necessary to hold the lock member when assembling the lock member to the connector housing, which can reduce the burden of the assembling operation, so that the efficiency of the assembling operation can be enhanced further.

Further, in the connector lock mechanism according to the invention, if the provisionally securing portions respectively include the tapered surfaces which can be slidingly contacted with the front ends of the shaft portions on the sides thereof facing the bearings, by pressing the given portion of the lock member, the shaft portions mounted on the provisionally securing portions can be fitted with the bearings further smoothly, which can enhance the assembling efficiency still further.

What is claimed is:

1. A connector lock mechanism comprising:

a pair of guide plates respectively disposed in vicinity of one connector provided on and projected from an electric connection box and including bearing portions;

a lock member including a pair of flexible support pieces having shaft portions projectingly provided thereon, said shaft portions respectively being fittable with said bearing portions, said lock member being rotated around said shaft portions of said flexible support pieces to engage an other connector fitted with said one connector;

provisionally securing portions, on which said shaft portions can be mounted, respectively formed in said guide plates; and guide grooves, respectively forming said guide plates for interconnecting said bearing portions and said provisionally securing portions, said guide grooves being tapered from a first width at said provisionally securing portions to a second, smaller, width at said bearing portions wherein said shaft portions are initially provisionally mounted on said provisionally securing portions and are thereafter fitted with said bearing portions respectively by pressing a predetermined portion of said lock member.

2. A connector lock mechanism as set forth in claim 1, further comprising:

a support portion, for supporting said lock member in a predetermined orientation when said shaft portions are respectively mounted on said provisionally securing portions.

3. A connector lock mechanism as set forth in claim 1, wherein each of said provisionally securing portions includes a tapered surface slidingly contacted with the front end of said shaft portion on the side thereof facing said bearing.

4. A connector lock mechanism as set forth in claim 2, wherein each of said provisionally securing portions includes a tapered surface slidingly contacted with the front end of said shaft portion on the side thereof facing said bearing.

* * * * *